No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 1.
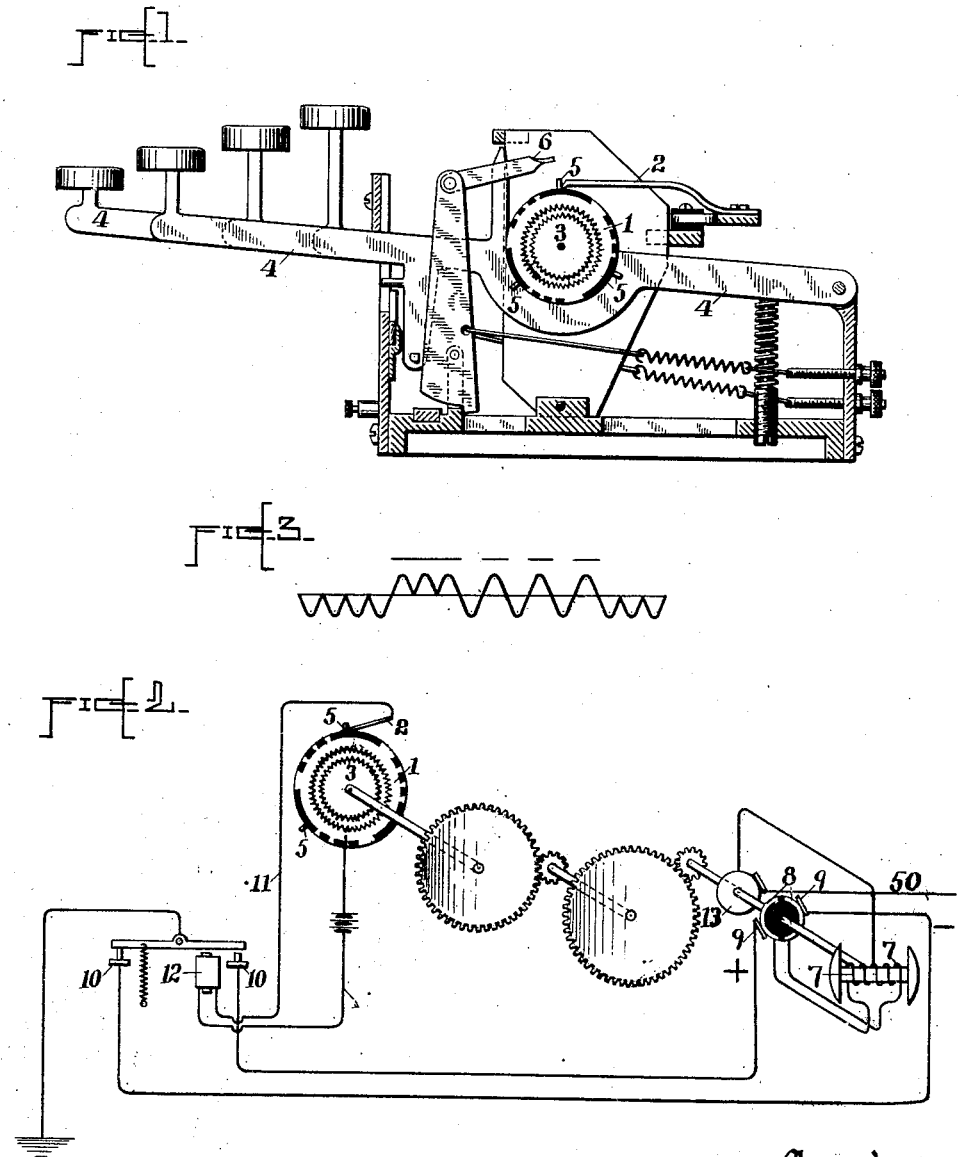
Witnesses:
Otto Greenberg
Ethel L. Lawler
Inventors
Albert C. Crehore
George O. Squier
By H. C. Townsend
Attorney No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 2.
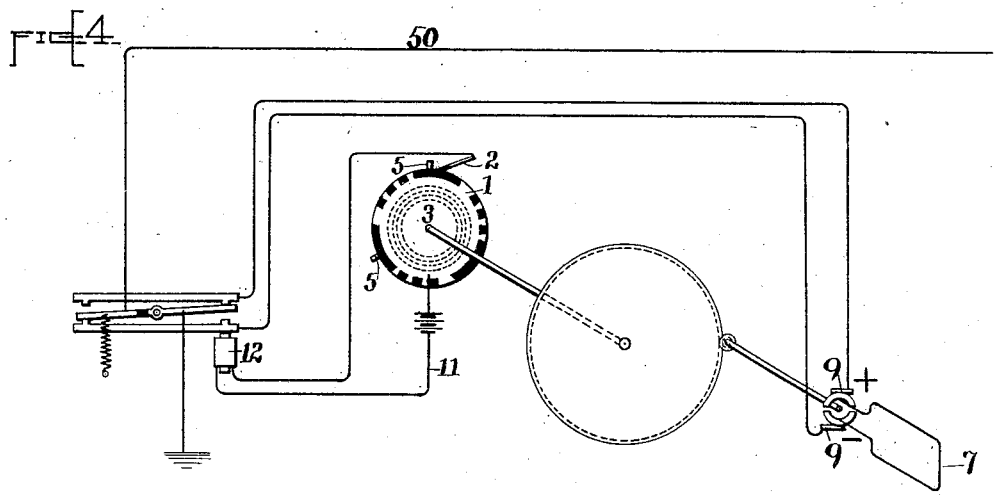
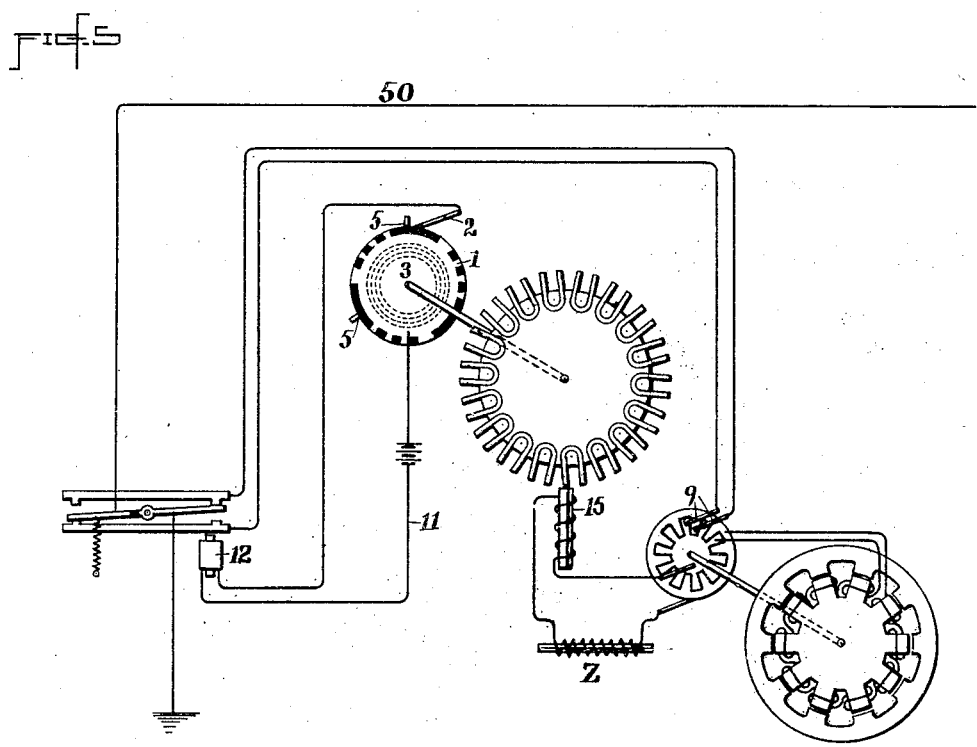
Witnesses:
Inventors
Albert C. Crehore
George O. Squier
By H. C. Townsend
Attorney No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 3.
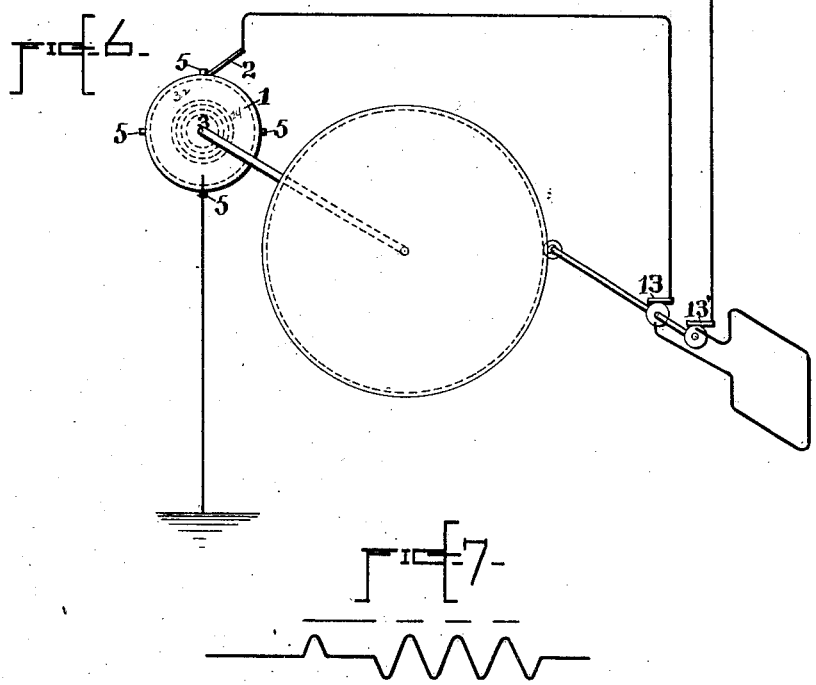
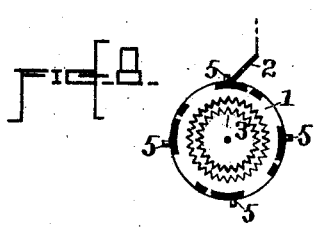
Witnesses:
Otto Greenberg
Ethel L. Lawler
Inventors
Albert C. Crehore
George O. Squier
By
H. C. Townsend
Attorney No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 4.
FIG. 7.
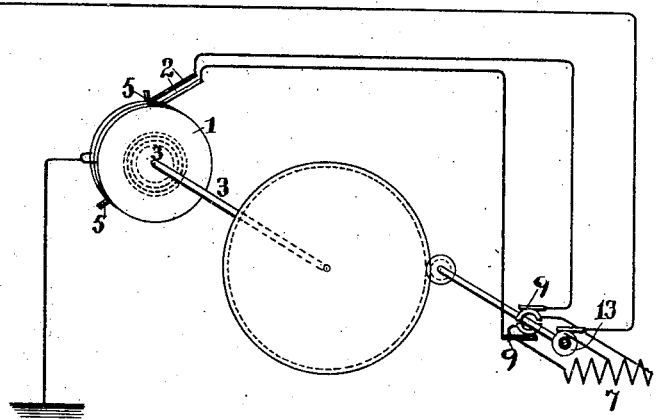
FIG. 10. FIG. 11.
 
FIG. 12.
Witnesses:
Otto Greenberg
Ethel L. Lawler
Inventors
Albert C. Crehore
George O. Squier
By
H. C. Townsend
Attorney No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 5.
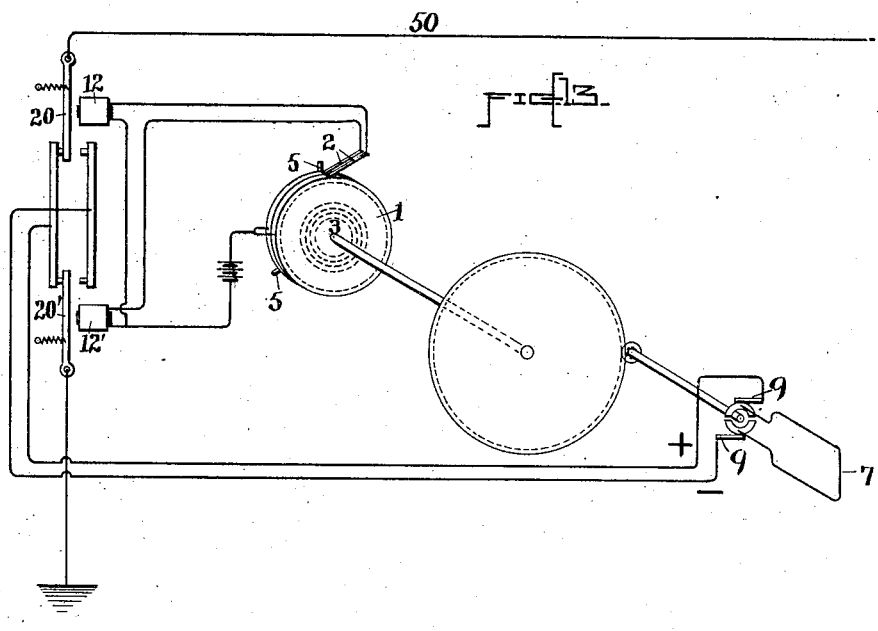
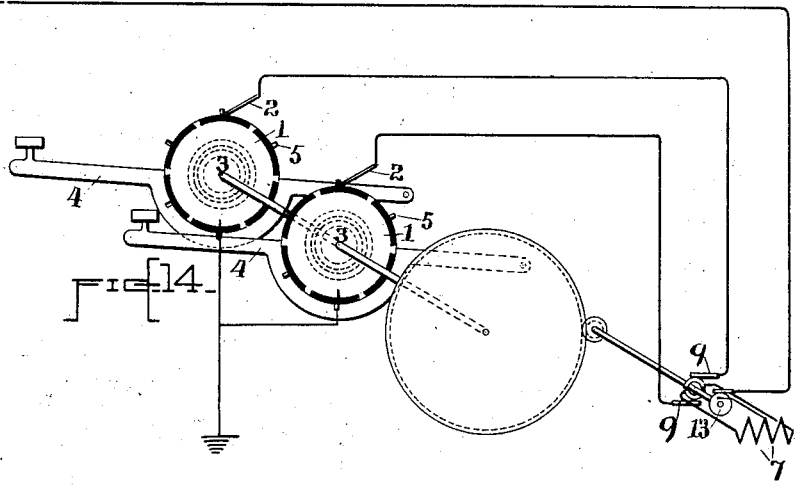
Witnesses:
Otto Greenberg
Ethel L. Lawler
Inventors
Albert C. Crehore
George O. Squier
By H. L. Townsend
Attorney No. 823,206. PATENTED JUNE 12, 1906.
A. C. CREHORE & G. O. SQUIER.
TELEGRAPH TRANSMITTER.
APPLICATION FILED APR. 8, 1901.
6 SHEETS—SHEET 6.
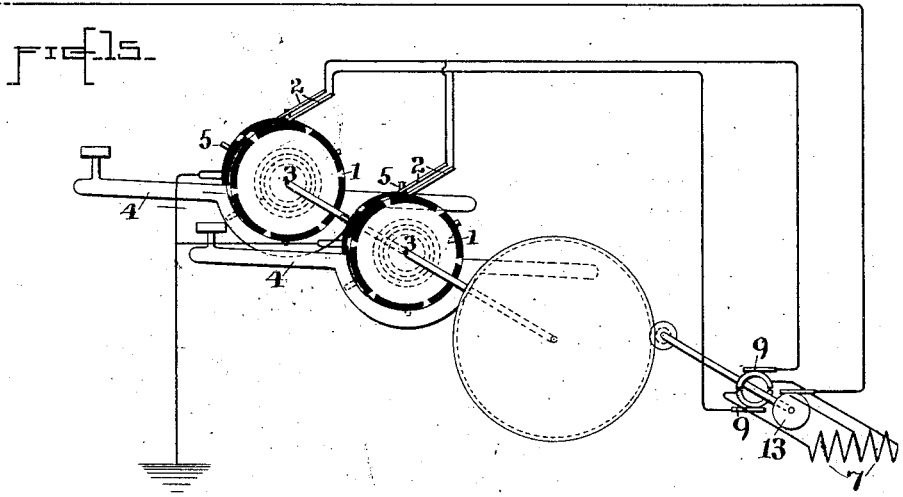
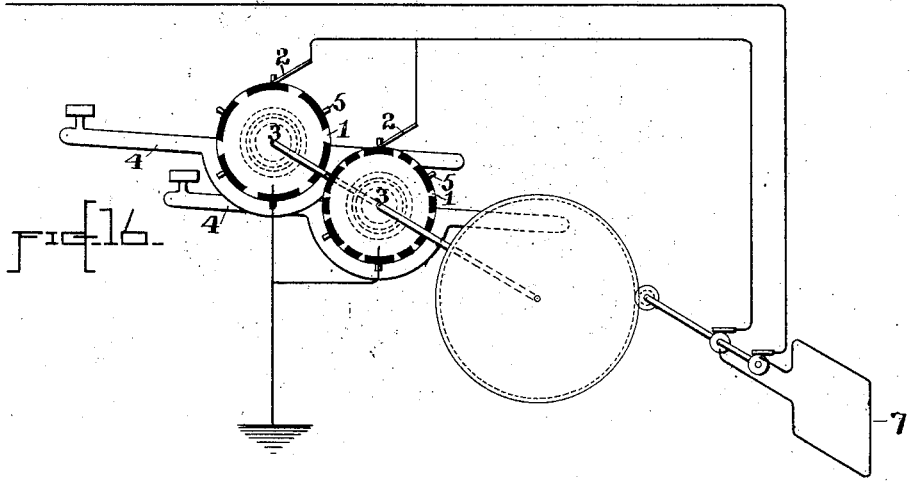
Witnesses:
Inventors
Albert C. Crehore
George O. Squier
By H. C. Townsend
Attorney

UNITED STATES PATENT OFFICE.

ALBERT CUSHING CREHORE, OF TARRYTOWN, NEW YORK, AND GEORGE OWEN SQUIER, OF WASHINGTON, DISTRICT OF COLUMBIA, ASSIGNORS TO THE CREHORE-SQUIER INTELLIGENCE TRANSMISSION COMPANY, OF CLEVELAND, OHIO, A CORPORATION OF OHIO.

TELEGRAPH-TRANSMITTER.

No. 823,206.     Specification of Letters Patent.     Patented June 12, 1906.

Application filed April 8, 1901. Serial No. 54,917.

*To all whom it may concern:*

Be it known that we, ALBERT CUSHING CREHORE, a resident of Tarrytown, in the county of Westchester and State of New York, and GEORGE OWEN SQUIER, a resident of Washington, District of Columbia, citizens of the United States, have invented certain new and useful Improvements in Telegraph-Transmitters, of which the following is a specification.

Our invention relates to telegraphic transmitting apparatus, and is designed to afford a convenient and effective means whereby the pulsations or semicycles of electromotive force from a dynamo-machine or other suitable generator may be impressed upon an electric circuit, in any desired order or time relation and according to the character or signal to be transmitted, by the simple depression or operation of a hand or finger key or lever. The pulsations so impressed may be all of one sign—namely, all positive or all negative—or they may be of both signs—that is to say, some positive and some negative—the order or sequence as to time and as to sign or polarity being controlled by the action of the device set into operation by the depression of the key.

By "pulsations of electromotive force" we mean an electromotive force which rises and falls in a gradual manner to and from zero or from zero to a maximum and back to zero in a manner which would be graphically expressed as a wave, and preferably we employ a generator which will produce sine waves or "pulsations of sine-wave form," though we do not limit ourselves to such form of pulsation and include by the term any variation in the form of wave of electromotive force produced either by a dynamo-machine originating the electromotive forces of varying potential or by a source of electromotive force of substantially constant potential whose value is varied by some external means interposed between it and the circuit upon which the electromotive forces are to be impressed. Ordinarily we prefer to employ a dynamo-electric generator of pulsating electromotive force. It will be understood that the generator produces a succession of the pulsations and that the flow of the same upon the circuit as to their time or order, or in the case of an alternating electromotive force, as to their polarity, is controlled by the operation of the mechanism.

Briefly stated, our invention comprises a circuit make-and-break ring or disk, one or more, a rotating shaft or driver with which the said disk may be coupled by the operation of its key, together with means for automatically uncoupling it when the signal or character has been transmitted, a generator of pulsating electromotive force mechanically or electrically connected with the driver-shaft so that the disk and generator may be run in synchronism, and make-and-break spaces on the ring or disk of such length or extent as are suitable for impressing the pulsations of electromotive force upon the circuit singly or in groups in the desired order or time relation.

In carrying out the invention we may use the make and break disk or ring as the direct means for controlling the connection of the generator with the line, or we may use it as a means for controlling the operation of a transmitter-lever or circuit-closer, which shall in turn control the connection of the generator with the line.

Our invention consists also in the details and combinations of apparatus hereinafter described and claimed and comprising, among other things, a special combination of pulsating generator, make-and-break rings and two keys operating, respectively, with said rings and acting one as a dot-key and the other as a dash-key, so as to furnish an improved transmitter that may be substituted for the present cable transmitter employing two keys, one a dot and the other a dash key.

The circuit make-and-break ring may be of any desired construction and controlled by the action of its key in any desired manner; but for this part of the apparatus we prefer to employ the mechanism described in the patents of C. E. Yetman, No. 534,025, dated February 12, 1895, and No. 565,128, dated August 4, 1896.

In the accompanying drawings, Figure 1 is a side elevation of the key mechanism and transmitting-ring or make-and-break ring controlled thereby, which we prefer to employ in carrying out our invention. Fig. 2 is a diagram of the apparatus and circuits in one of the forms which our invention may take, the controlling-key and associated mechanism being omitted. Fig. 3 illustrates the succession of pulsations which would be impressed upon the circuit by the apparatus shown in Fig. 2. Fig. 4 illustrates diagrammatically a modification of the invention wherein a circuit-reverser is employed in place of the transmitter-lever shown in Fig. 2. Fig. 5 shows a modification of our invention wherein synchronism between the pulsating-generator and the make-and-break ring or its drive-shaft is attained by the use of a synchronous motor. Fig. 6 shows a modification wherein the make-and-break ring is in the direct circuit with the alternating generator and wherein also the use of a commutator for the dynamo is dispensed with. Fig. 7 illustrates the succession of pulses which would be sent by the use of the apparatus shown in Fig. 6 when the make-and-break ring has make-and-break spaces like those shown in Fig. 8. Fig. 9 illustrates diagrammatically another modification of our invention adapted to send or impress a succession of pulsating electromotive forces like those shown in Fig. 2. Fig. 10 is a plan of the double make-and-break disk which would be used for this purpose in connection with the apparatus shown in Fig. 9. Fig. 11 shows a modification of the double make-and-break disk adapted to send a group of pulses such as illustrated in Fig. 12 when said disk is employed in an organization such as illustrated in Fig. 9. Fig. 13 is another modification showing how a common form of transmitter may be utilized in the combination. Fig. 14 illustrates our invention when adapted for use with the dot and dash keys of a cable-transmitter. Figs. 15 and 16 illustrate another modification wherein two keys are used, one operating as the dot-key and the other as the dash-key. Fig. 17 shows the arrangement of conducting spaces for the double ring used with the dot-key in Fig. 15, and Fig. 18 shows the arrangement of conducting spaces for the double ring used with the dash-key in Fig. 15.

1 indicates the make-and-break or contact ring or disk mounted so as to be capable of revolution under the contact spring or brush 2, and to thereby make and break an electric circuit, including the ring and brush. 3 is a rotating shaft or driver kept in constant rotation by any power and furnished on its periphery with teeth or serrations adapted to engage with the serrated or toothed inner edge of the disk. 4 is the key by the depression of which the ring or disk is coupled to the shaft or driver 3, and 5 indicates the pins which rotate with the disk and serve to operate the latch 6 as soon as the signal has been transmitted, thereby freeing the key-lever and disconnecting the make-and-break ring from its driving-shaft. As many of said disks may be provided as desired, each having its appropriate key-lever 4. Where each key-lever corresponds to a letter of the alphabet, a number of such disks would be provided corresponding to the number of characters to be transmitted. This mechanism in its general form is the same as that described in the Yetman patent before referred to. The manner in which it is necessary to readjust and reproportion this device and to modify its parts and connections with the circuits for the purpose of making it suitable for use in carrying out our present invention will be hereinafter more fully described. It is sufficient here to state that the relation or proportion of the teeth in the shaft or driver and the ring or disk must be definitely related to one another and to the mechanical connections between the same and the dynamo, and, further, by so modifying it that the tooth of one shall be only fully seated in the notch of the other when the parts are in a definite phase relation; further, that the periphery of the wheel must be definitely laid off into conducting and non-conducting spaces definitely and systematically related to the other parts of the organization. The particular relations or proportions in the above respects will also be found to be modified according to the manner in which the device is connected up to the circuits of the dynamo and to depend also upon the use or non-use of a supplemental lever. Our invention may, however, be applied to a transmitter having only two disks, one for dots and the other for dashes, as will be hereinafter described. It will also be understood that other means may be employed for coupling the make-and-break disks with a driver upon the depression of a key, and other mechanisms employed for automatically freeing it from its driver and for keeping it coupled thereto until the character or signal has been transmitted.

Referring to the diagram Fig. 2, the two generator coils or halves of generator-coil for a two-pole dynamo are indicated by the numerals 7: 8 indicates the two halves of a commutator to which said coils are respectively connected, and 9 the commutator-brushes, which are connected, respectively, with the contact posts or terminals 10 of a transmitter-lever, the lever itself being connected to earth or to line 50 and being controlled as to its position by the action of the make-and-break ring 1 when rotated so as to make and break a circuit 11, which includes the coils of a magnet 12, operating on the transmitter-lever in opposition to a retractor-spring. 13 is a continuous collector-ring on the same shaft with the commutator of the dynamo and is connected to the generator coil or coils 7, as shown, so as to complete, through the collector-brush bearing on said ring, the circuit from said coil to line or earth. The dynamo being in constant rotation will supply to the terminals 10 of the transmitter a series of pulsations or waves of electromotive force which will be positive for one terminal or post—to wit, that which is normally open—and negative for the other terminal or post—to wit, that on which the lever normally closes the connection by the operation of its retractor. The dynamo is properly connected with the driver-shaft 3 in any suitable manner, so that they shall revolve in synchronism. With a two-pole dynamo a speed-reduction gear having a ratio of eighteen to one may be employed. The transmitter-ring is shown as adapted to send a character three times for each whole revolution—that is to say, the arrangement of makes and breaks suitable for impressing the series of pulsations to send the dash and three dots representing the letter B of a telegraphic alphabet is repeated three times in the periphery of the disk. The whole circumference may be conceived of as divided into forty-eight unit-spaces, each representing one pulsation of electromotive force, and hence each segment or sector in which one character is embraced will comprehend sixteen of said unit-spaces transmitted over the circuit, or, in other words, the dynamo should generate twenty-four whole waves or forty-eight semiwaves during the time that the disk is making a whole revolution under its contact-brush. To produce this effect, there should be thirty-six teeth in the pinion or serrated periphery of the shaft 3 and forty-eight teeth on the inside of the ring. When the dynamo is geared to the shaft 3 and the gearing between said shaft and the ring is provided in the manner shown, it will be obvious that during the time that the ring makes a third of a revolution, which will occur whenever the key 4 is depressed, the dynamo will supply sixteen pulsations of electromotive force of negative sign and sixteen of positive sign. So long as the lever of the transmitter is on its back-stop the pulsation passing to line will be of negative sign only; but if during the interval of time covered by any pulsation or pulsations the local circuit 11 be closed by the make-and-break disk, there will be substituted upon the circuit or line controlled by the transmitter positive pulses, owing to the fact that during the unit interval or intervals of a single pulsation or number of pulsations the magnet 12 will hold the lever against the stop, which is connected to the dynamo-brush, supplying positive pulses. By properly disposing the conducting and insulating spaces on the ring and by making each of the proper length it is obvious that individual pulsations of electromotive forces, positive and negative in any desired order, may be impressed upon the circuit.

The effect produced by rotation of the disk one-third of its circumference is shown in Fig. 3. During its rotation over the first four unit-spaces the brush 2 remains on insulation and the transmitter-lever remains on its back contact, so that negative pulses, four in number, flow to line. The first conducting-space encountered by the brush covers three unit-spaces, so that during the generation of three pulses by the dynamo the transmitter-lever will be connected to the positive brush and disconnected from the negative through the action of the magnet 12, and there will flow upon the line three positive pulses corresponding to the dash forming the first signal for the letter "B." The closure of the circuit on the first conducting-space of the ring is timed to take place at or about the zero of electromotive force developed in the dynamo—that is to say, at a point between the two succeeding waves of electromotive force coincidently with which the magnet 12 closes the circuit to the positive brush of the dynamo, so that the current from said brush will begin to flow at or about the beginning of the pulse. In order to time the action of the transmitter-lever so that it shall close circuit at the proper instant, the brush 2 may be made adjustable around the periphery of the disk. After the transmission of the three positive pulses over the front contacts of the transmitter the brush 2 encounters insulation equal to one unit-space, so that the transmitter-lever falls against its back contact and a negative pulse will go to line, such pulse being in the nature of a clearing-out pulse, which is desirable in some systems of telegraphy. The three following conducting-spaces on the disk each cause one positive pulse each corresponding to a dot to be transmitted, and the two intervening insulating-spaces, each of unit length, send the negative or clearing-out pulse in obvious manner, while the last insulating-space encountered by the brush before it comes to rest causes three or more negative pulses to be sent to line, forming clearing-out and space pulses. It is obvious that the number of negative pulses at the beginning and the end of the movement of the disk attending the transmission of one character may be of any desired number and that the number before and after the transmission of the group forming the dash and three dots may be relatively different from the number indicated. The number transmitted before the dash begins affords time for the teeth of the shaft and ring to become fully engaged before the brush reaches the conducting-space, thus insuring that the dynamo and the ring shall not be out of phase when the transmission of the character begins through the operation of the transmitter-lever. This preliminary or preparing insulating-space is provided in all cases and may be of greater or less length—that is to say, it embraces the period of propagation of the necessary number of pulsations of electromotive force in the dynamo or other generator. It is obvious that any desired ratio of gear may be employed between the dynamo and the shaft 3, provided only that it shall be such that during a whole revolution of the disk a whole number of pulsations shall be generated by the dynamo. It is also obvious that the character may be repeated upon the disk any number of times or may be transmitted but once for a whole revolution. In a complete keyboard-transmitter the conducting and insulating spaces of each disk would be made to correspond to the character to be transmitted by its controlling-key in obvious manner. It will also be obvious that the dynamo might be on the same shaft as the shaft carrying the pinion which engages with the inside of the ring or disk, but that it should in such case, when the disk or ring is spaced, as shown, be a forty-eight-pole dynamo.

In the modification shown in Fig. 4 a two-pole dynamo is indicated having a coil 7 connected to a commutator of the ordinary description, but without any division or duplication of coils, such as is effected by the use of the collector-ring 13, connected as shown in Fig. 2. In this instance the line and earth are connected, respectively, to the two insulated parts of a pole-changing transmitter-lever, and the four contacts of the latter are connected to the dynamo-brushes, as indicated. In the normal position of the lever the negative brush of the dynamo is to line and the positive to earth, so that the coil 7 will supply to the line negative pulsations; but when the position of the lever is changed by the action of the transmitter-disk, operating through the magnet 12, the line will be connected to the positive brush and positive pulsations will go to line in definite number corresponding to the number of unit-spaces covered by the conducting portion of the disk, which, for the time being, passes under the brush. The gearing of the dynamo to the operating-shaft or the disk may have a reduction ratio of eighteen to one or any other proper ratio.

Fig. 5 is a modification illustrating the use of a synchronous motor for obtaining synchronism of the pulsating generator and the shaft which drives the ring or rings of the apparatus. The synchronous motor is typified in a magnet 15, whose pole is presented to a ring of eighteen permanent magnets, each having a positive and negative pole and mounted on the shaft 3 so as to rotate therewith and be presented in succession to the pole of the magnet 15. The pulsating generator is shown as a ten-pole generator and as provided with a commutator, each half of which has ten teeth or segments engaged by the brushes 9 in succession in the usual manner, so that one of said brushes will afford a succession of positive pulsations, and the other a succession of negative pulsations of electromotive force to the terminals of the pole-changing transmitter. The synchronous motor is supplied with alternating current directly from the generator, as clearly shown in the diagram, the electromotive force being controlled by the adjustable impedance-coil Z for regulation purposes. The pinion of the shaft 3 and the inside of the ring or disk 1 are provided, respectively, with thirty-six and forty-eight teeth, or in any other proportion, the number of teeth on the pinion when directly coupled to the motor being equal to the number of poles of the motor.

Figs. 6 and 8 illustrate a modification in which the make and break ring or disk is included in a direct circuit with the dynamo generator and line. The dynamo has no commutator, but is provided with the usual collector-rings 13 13' to permit the alternating electromotive force to be taken directly from the dynamo. As shown in the diagram Fig. 6, one of said rings 13 has its brush connected to the brush 2 of the make-and-break ring, while the other collector 13' is connected to line. As will be obvious to electricians, the collector-rings would not be necessary if the generator were one in which the generating-coils or parts are stationary. In this arrangement one tooth of the pinion or gear on the driver-shaft 3 should correspond to one or more complete waves of electromotive force developed in the generator—that is to say, to a complete cycle of electromotive force comprising two semicycles, one positive and the other negative. The generator-coil indicated is that for a two-pole dynamo, and the armature-shaft is geared to shaft 3 by a reducing-gear having a ratio of twenty-four to one. There are twenty-four teeth in the pinion or gear on shaft 3 and thirty-two teeth on the inside of the ring 1. Each movement of the ring when set into operation by the key preferably, as before, embraces or covers sixteen unit-spaces on its periphery, each space corresponding to a half-wave or semicycle of the electromotive force and the sixteen together embracing eight whole waves of electromotive force as developed by the generator.

The diagram Fig. 7 illustrates the order of transmission of pulses, positive and negative, sometimes used in cable telegraphy for transmitting the letter "B," and the make-and-break ring or disk in Fig. 8 shows in side view the corresponding arrangement of conducting and insulating spaces that would be used on the edge of the same for the purpose of transmitting said character "B." The dash is transmitted by a positive pulse followed by a blank space of no transmission of current caused by the presence of insulation under the contact-brush 2, after which comes a negative or clearing-out pulse produced by a conducting-space which engages said brush 2. The previous insulating-space which follows the positive pulse is made equivalent to two pulses—namely, the negative pulse following the first positive pulse and the succeeding or next positive pulse. In this method of transmission the dash at the receiving end is produced by the prolongation of the charge of the cable resulting from the first positive pulse and which continues until the negative pulse forming the clearing-out pulse is transmitted. The transmitting-brush remains on metal, as indicated, for six more unit-spaces after that which sends said clearing-out pulse, thereby sending single positive pulses, three in number, one for each dot of the character, followed each by a negative or clearing-out pulse, after which and for the remainder of the movement of the disk to position of rest the brush remains on insulation, thus cutting off the dynamo from line. At the beginning of a new movement the brush rests on insulation until the parts are geared in full phase and then begins to transmit the character in the manner just described by reaching the contact portion of the ring just as the generator begins to generate a whole wave of electromotive force, starting with positive potential. As will be obvious the arrangement lends itself to the transmission of other characters, according to the arrangement of the conducting and insulating spaces on the edge of the disk, said spaces being so arranged in any case that the circuit shall be broken approximately at the zero of the current flowing from the dynamo.

Figs. 9 and 10 show another way of organizing the apparatus so as to dispense with the use of the transmitter-lever shown in Fig. 2 and yet to permit groups of pulsations of the same character as represented in Fig. 3 or of any other desired character to be transmitted directly. This is accomplished simply by placing the make-and-break ring in a direct circuit between the generator and the line, whereas in the other instances—as, for instance, Figs. 2, 4, 5, and 13—the transmission is effected by placing the rings in a local circuit which operates upon a transmitting lever or levers controlling the connection of the generator with the line. The make-and-break ring is a double or two-part ring whose parts are insulated from one another, as indicated in Fig. 10, which shows one-third of the periphery of the ring projected on the plane of the paper or enough for one transmission and embracing sixteen pulsations or units. The two rings operate mechanically as one; but each has its own transmitter-brush 2, one of which is connected to the positive brush or portion of the generator which affords the positive pulsations of electromotive force and the other to the portion of the generator which affords a connected series of negative pulsations. The line is connected to the continuous collector-ring 13 and the two rings to earth, or vice versa. The disposition of the conducting and insulating spaces necessary to send directly to line the same series or grouping of pulsations, positive and negative, (indicated in Fig. 3,) is illustrated in Fig. 10 and by comparison with said Fig. 3 will be found self-explanatory. As will be obvious, if both brushes are made to rest on insulation at the same time on their respective halves of the make-and-break rings or disks the circuit of the line will be broken and no pulsations of electromotive force will be applied thereto.

Fig. 11 shows the double ring with conducting and insulating spaces arranged to effect a transmission used in cable telegraphy and such as indicated in Fig. 12—that is to say, a single whole negative pulsation followed immediately by a series of three connected positive pulsations and no current for the balance of the sixteen unit spaces or periods before and after the four conducting-spaces.

Fig. 13 shows a modification of the invention in which a pole-changing-transmitter device of common form having two independently-operable transmitter-levers instead of one is employed. The two levers are operated by two independent magnets 12 12', thus requiring the use of two make-and-break rings or a compound or divided ring like that indicated in Fig. 10. It will be understood that in this case, as in the case of the arrangement shown in Figs. 9 and 10, the two rings are preferably operated as one in response to the action of a single key. The two separate transmitter-levers 20 and 20' are connected, respectively, to earth and line, and both normally rest on one of two bars or sets of connected contacts connected, say, to the portion of the generator affording the negative pulsation. Either may be drawn to contact with a bar or set of contacts connected to the portion of the dynamo affording positive pulsation by the magnets 12 12', these latter being in circuits controlled, respectively, by the two halves or portions of the make-and-break ring. Normally the line is to earth. In sending a negative pulsation magnet 12 is excited over the circuit including its half of the make-and-break ring by having the contact-brush connected to it encounter a conducting portion of the contact-ring, the length of which in unit spaces determines the number of negative pulsations that shall be sent to line from the generator. In sending a positive pulsation or pulsations magnet 12' is operated from its half of the contact-ring for a greater or less length of time corresponding to the whole number of pulsations to be transmitted. When neither lever is operated, which occurs when both brushes of the make-and-break ring rest on insulation, no current goes to line. By proper disposition of the conducting and insulating spaces any order or arrangement of pulsations, positive and negative, may be sent—such, for instance, as those shown in Figs. 3, 7, and 12. It will be understood that in this case and in the case of the arrangements of apparatus shown in Figs. 9 and 10 the two halves or portions of the make-and-break ring are operated as one upon the depression of the key.

Fig. 14 shows diagrammatically an arrangement suitable for use where the character is composed as to its elementary signals by the operation in proper order or succession of two keys, one of which is the "dot" and the other the "dash" key, as in those systems wherein a positive pulse or signal means a dash and a negative means a dot. In this case the complete transmitting apparatus would comprise merely two make-and-break rings or disks 1, each having its own control-key 4 and each operable independently of the other. Each disk or ring might control the circuit of a transmitter which would govern the application of the electromotive forces or pulsations of electromotive force generated by the dynamo or other apparatus to the line, as already described, or each might be included directly in the line-circuit, as indicated in the diagram Fig. 14. One of said rings when momentarily coupled to the driving-shaft, and so made to run synchronously with the dynamo, would cause a positive pulse to be transmitted, while the other when operated by the depression of the key would in a similar manner send a negative pulse. In the particular arrangement indicated in the diagram the dynamo is supposed to be a two-pole dynamo connected to the operating-shaft of the two rings or disks by a gear having a ratio of eighteen to one or any other proper ratio. The brush of one ring or disk is connected to the part of the dynamo affording positive pulses and the brush of the other to the part affording negative pulses. The two rings are connected to earth in the manner already described and as illustrated in Fig. 9 and the dynamo to line through collector-ring 13, or vice versa. On each ring the conducting-space, which passes under the brush when the ring is set into operation, is of such length and so located as to transmit a single pulse and to make and break the circuit approximately at the zero of the wave of current. It will be understood that in this case the rotation permitted to the disk would be much shorter in extent than is required in the instances previously described and that the single conducting-space for each transmission might be repeated any desired number of times in the periphery of the disk or ring.

Figs. 15 and 16 illustrate further modifications of the dot and dash key transmitter wherein the disk or ring for the dot-key is adapted to send for the dot a positive pulse followed directly by a negative pulse for clearing-out purposes and the disk or ring for the dash-key is adapted to send a positive pulse and then to stop the transmission of pulses for an interval corresponding to two semicycles—that is, for the semicycle forming a negative of the first whole wave together with the semicycle forming the positive of the next whole wave—and after such interval of no current to send a negative or clearing-out pulse or semicycle. In Fig. 15 the ring or disk for each of the two keys is a two-part ring or disk of the same character as is illustrated in Fig. 10, and the two brushes for each compound disk or ring are connected, respectively, to the portions of the generator affording positive and negative pulsations. The dynamo may be geared to the driving-shaft of the ring by a gear having a reduction ratio of eighteen to one, and the signal or transmission effected by this disk may be repeated any desired number of times in the circumference of the disk. The disks themselves will be connected to line or to earth and the dynamo to line or earth through the collector-ring, if one be employed and as shown in the diagram. As indicated by the relative location of the conducting-spaces on the ring to the brushes which are supposed to be in their normal position, the initial movement of each ring is unaccompanied by the action on the circuit; but as soon as the gear is in full engagement the transmission may begin, the dynamo and the ring then being in phase and adapted to cause makes and breaks of circuit synchronous with the production of pulsations by the dynamo. In the modification illustrated in Fig. 16 the dynamo feeds alternating electromotive forces to the ring controlled by each key and each ring is single and has but one brush. In the ring for the dot-key the conducting-space is of such length that the brush will impress upon the circuit a whole wave of electromotive force—that is to say, a positive pulse followed immediately by a negative—while in the further movement of the ring to position of rest the brush bears on insulation for a space of two semicycles. As indicated in the diagram, the terminals of the generator-coil are connected, respectively, to the brush and line direct through proper collector-rings. In the case of the dash-ring the first conducting-space which the brush encounters would be but half the length of that in the dot-ring, thus sending to line one positive pulse, and the insulating-space next encountered would be of sufficient length to produce a period of no transmission equal to a whole wave, thus completing the signal, after which the brush would pass over the conducting-space of proper length to send the negative or clearing-out pulse. By this arrangement it is obvious that the same order or sequence of pulses, positive and negative, would be impressed upon the circuit the same as in the case of the arrangement illustrated in Fig. 15.

Other modifications obviously may be made in the arrangement of the conducting and non-conducting spaces on the disk and in the manner of connection of said disk and brushes therefor with the circuits of the generator and in the circuits of the generator itself without departing from our invention.

What we claim as our invention is—

1. In a telegraphic transmitter the combination substantially as described of a make-and-break ring, a drive-shaft therefor, means for coupling the ring and shaft at will, a generator of pulsating electromotive forces running synchronously therewith and conducting and insulating spaces on said ring all combined and proportioned as described to produce changes in the circuit of the ring synchronously with the production of the pulsations by said generator and to thereby impress upon the circuit pulsations of definite number and polarity.

2. In a telegraphic transmitting apparatus the combination substantially as described of a make-and-break ring, a drive-shaft, a pulsating generator with which said drive-shaft is run in synchronism, a key for coupling the ring and shaft at will, means for automatically uncoupling the ring and shaft when the ring has moved to a predetermined extent and conducting and insulating spaces on the ring all combined and proportioned as described to cause makes and breaks of circuit in synchronism with the production of pulsations by the generator and to thereby impress upon the circuit pulsations of definite number and polarity.

3. In a telegraph transmitting apparatus, the combination of a circuit making and breaking ring, a pulsating-current generator, a controlling key or lever and a clutch device controlled thereby for connecting the generator and ring in definite phase relation and causing them to run in synchronism, all combined and proportioned as described to permit the ring to impress definite whole pulsations of electromotive force positive and negative upon the circuit whenever the key is depressed.

4. In a telegraphic transmitting apparatus the combination substantially as described of a make-and-break ring, a drive-shaft, a coupling device adapted as described to connect the shaft and ring so that the ring will be in a definite phase relation to a generator, a key for coupling the ring and shaft at will, a pulsating-current generator running in synchronism with said drive-shaft and conducting and non-conducting spaces on the ring adapted to impress the pulsations of electromotive force upon the circuit in a predetermined order or time relation.

5. The combination substantially as described of a generator of alternating electromotive force, a circuit make-and-break ring in the direct circuit of the alternating pulsations, means for coupling said ring in definite phase relation with the alternations or pulsations produced by said generator and conducting and insulating spaces on said ring adapted to impress the alternating electromotive force upon the circuit as a series of pulses of predetermined order or sequence as to time and as to sign or polarity.

6. In a telegraphic transmitting apparatus the combination with a generator adapted to furnish two sets of pulsations positive and negative respectively, of a double or two-part make-and-break ring running in synchronism with said generator and having its parts included respectively in the circuit of the positive and negative pulsations said rings being provided with conducting and non-conducting spaces arranged and combined as described to cause the pulsations to be impressed upon the circuit as single pulsations or groups of pulsations and in predetermined order as to time and polarity.

7. In a telegraphic transmitting apparatus, a combination substantially as described of a pulsating-current generator furnishing two sets of pulsations positive and negative respectively, a double make-and-break ring having two rows of contacts in the circuit respectively of said pulsations, a controlling-key for coupling the same at will with a shaft running synchronously with the generator so that said ring may operate together in synchronism therewith, and make-and-break spaces on said ring adapted to operate on the circuit synchronously with the production of the individual pulsation.

8. In a telegraphic transmitting apparatus the combination with a pole-changing-transmitter device having two independently-operable circuit-closing levers, of a generator of pulsations of alternating electromotive force, electromagnets controlling the position of said lever and a double make-and-break ring adapted to be run in synchronism with said generator.

9. In a telegraphic transmitter the combination substantially as described of a make-and-break ring, a drive-shaft therefor, means for coupling the ring and shaft at will, and adjusted as described to secure a complete coupling of the ring and shaft when the parts are in definite phase relation to the generated alternating-current generator and conducting and insulating spaces on said ring adapted as described to produce changes in the circuit of the ring synchronously with the production of the pulsations by said generator.

10. In a telegraphic transmitting apparatus the combination substantially as described of a make-and-break ring, a drive-shaft, an alternating-current generator with which said drive-shaft is run in synchronism, a key for coupling the ring and shaft at will in definite phase relation with the alternating generator, means for automatically uncoupling the ring and shaft when the ring has moved to a predetermined extent and conducting and insulating spaces on the ring adjusted as described to cause makes and breaks of circuit in synchronism with the production of pulsations by the generator.

11. In a telegraphic transmitting apparatus the combination substantially as described of a circuit-make-and-break ring included in the circuit of an alternating-current generator and adapted to be run in synchronism with said generator, a controlling key or lever for setting said ring or disk into rotation in definite adjusted phase relation with the alternating-current generator at will, said ring being provided with conducting and non-conducting spaces adapted as described to make and break circuit in synchronism with the production of the pulsating electromotive force and to impress said electromotive forces on the circuit either singly or in groups and in any desired order predetermined by the arrangement of the spaces.

12. In a telegraphic transmitting apparatus the combination substantially as described of a make-and-break ring, a drive-shaft, a key for coupling the same with the shaft at will, a coupling device controlled thereby and having its parts organized as described to bring the ring and shaft into full coupled relation when the parts are in definite phase relation to one another as set forth, an alternating-current generator running in synchronism with said drive-shaft and conducting and non-conducting spaces on the ring adapted to impress the pulsations of electromotive force upon the circuit in a predetermined order or time relation.

Signed at New York, in the county of New York and State of New York, this 28th day of August, A. D. 1900.

ALBERT CUSHING CREHORE.
GEORGE OWEN SQUIER.

Witnesses:
D. H. DECKER,
E. L. LAWLER.